United States Patent [19]

Rattlingourd

[11] 4,380,080
[45] Apr. 12, 1983

[54] TRI-LEVEL DIFFERENTIAL LINE RECEIVER

[75] Inventor: Glen D. Rattlingourd, Salt Lake City, Utah

[73] Assignee: Sperry Corporation, New York, N.Y.

[21] Appl. No.: 221,248

[22] Filed: Dec. 30, 1980

[51] Int. Cl.³ .............................................. H03K 5/13
[52] U.S. Cl. ..................................... 375/17; 371/68; 307/236; 375/36
[58] Field of Search ................................ 375/17–20; 371/56, 67–71; 307/236, 360, 351; 328/115, 118, 163; 358/262; 455/608; 340/347 DD; 360/40, 41

[56] References Cited

U.S. PATENT DOCUMENTS

| 3,715,738 | 2/1973 | Kleist | 360/40 |
| 4,097,859 | 6/1978 | Looschen | 340/347 DD |
| 4,153,848 | 5/1979 | Miyazaki | 307/236 |
| 4,271,526 | 6/1981 | Flora | 375/20 |

Primary Examiner—Benedict V. Safourek
Assistant Examiner—Stephen Chin
Attorney, Agent, or Firm—Kenneth T. Grace; Marshall M. Truex

[57] ABSTRACT

A tri-level serial data stream and its inverted form are received and separated into data and clock for use with standard bi-level logic. The incoming tri-level signal and its inverted form are separately biased to permit a true differential comparison and signal detection. High common mode rejection of noise that is developed between a transmitter and receiver is thus provided.

11 Claims, 12 Drawing Figures

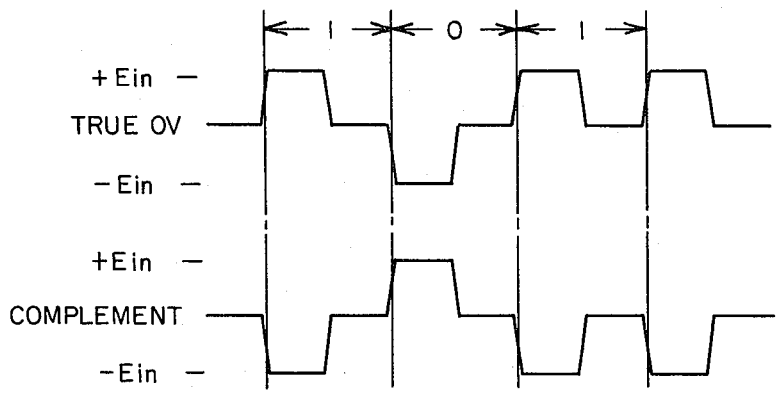
FIG. 3A
FIG. 3B
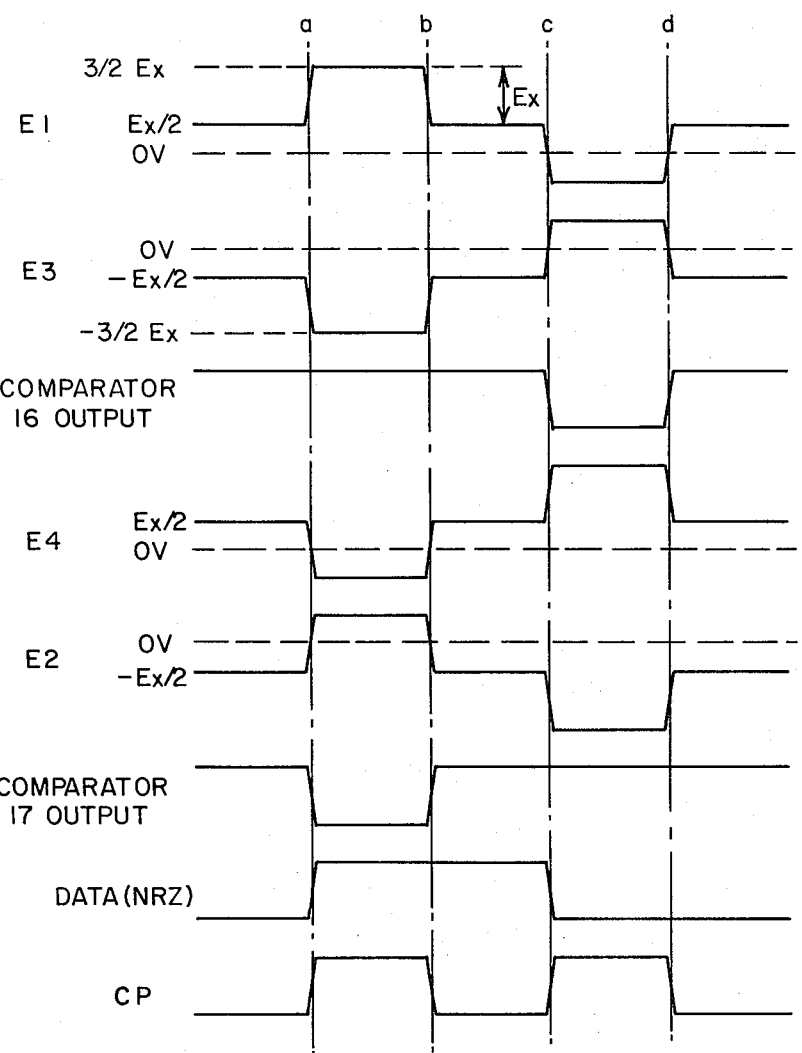
FIG. 4A
FIG. 4B
FIG. 4C
FIG. 4D
FIG. 4E
FIG. 4F
FIG. 4G
FIG. 4H

TRI-LEVEL DIFFERENTIAL LINE RECEIVER

BACKGROUND OF THE INVENTION

This invention relates to a circuit for producing true differential line reception for a differentially driven tri-level signal.

Tri-level bipolar signals are often transmitted over a pair of lines. Such signals have no DC component and require relatively narrow bandwidth; however the transmission lines add noise. The receiver recovers and processes the bipolar signals to reproduce the transmitted data.

Various circuits have been used for recovering and processing such bipolar signals. Typical are the circuits shown by U.S. Pat. No. 3,894,288 to Musser, Jr.; 3,518,560 to Auiqnon and 4,007,382 to Warberg. This and other prior art use DC biasing techniques that compare each signal line to a locally generated DC bias. This technique degrades the signal to noise ratio, while eliminating any common mode noise rejection. It is an object of the present invention to provide a simple and true differential line receiver for differentially driven tri-level signals. Another object of the present invention is to provide an improved circuit for receiving and separating a differential tri-level serial data stream and converting the received serial data stream into data and clock for use with standard bi-level logic. Another object is to provide improved input biasing of differential tri-level inputs to permit a true differential comparison and signal detection. Another object is to provide high common mode rejection of noise that is developed during transmission.

SUMMARY OF THE INVENTION

The invention provides two comparators each having an initial offset voltage to level shift incoming return to zero (RZ) tri-level signals. Both the true tri-level signal and its complement are applied to the comparator networks. The output of one comparator represents a "zero" state detected while the output of the other comparator is an indication of a detected "one" state. These outputs are then simultaneously applied to a bistable RS flip-flop and a bistable NAND gate to produce the desired nonreturn to zero (NRZ) data and clock pulse outgoing signals, respectively. The input biasing of the differential tri-level inputs is accomplished with a pair of symmetrical resistive networks to permit a true differential comparison and signal detection. The phrase "resistive network" shall mean a network consisting of resistor elements only.

BRIEF DESCRIPTION OF THE DRAWINGS

FIGS. 3A and 3B are waveforms representing respectively a true tri-level signal and its complement as applied to the input of the circuit of FIG. 1.

FIGS. 4A through 4H are waveforms representing signals appearing at various places in the circuit of FIG. 1.

DETAILED DESCRIPTION OF A PREFERRED EMBODIMENT

Figure 1:
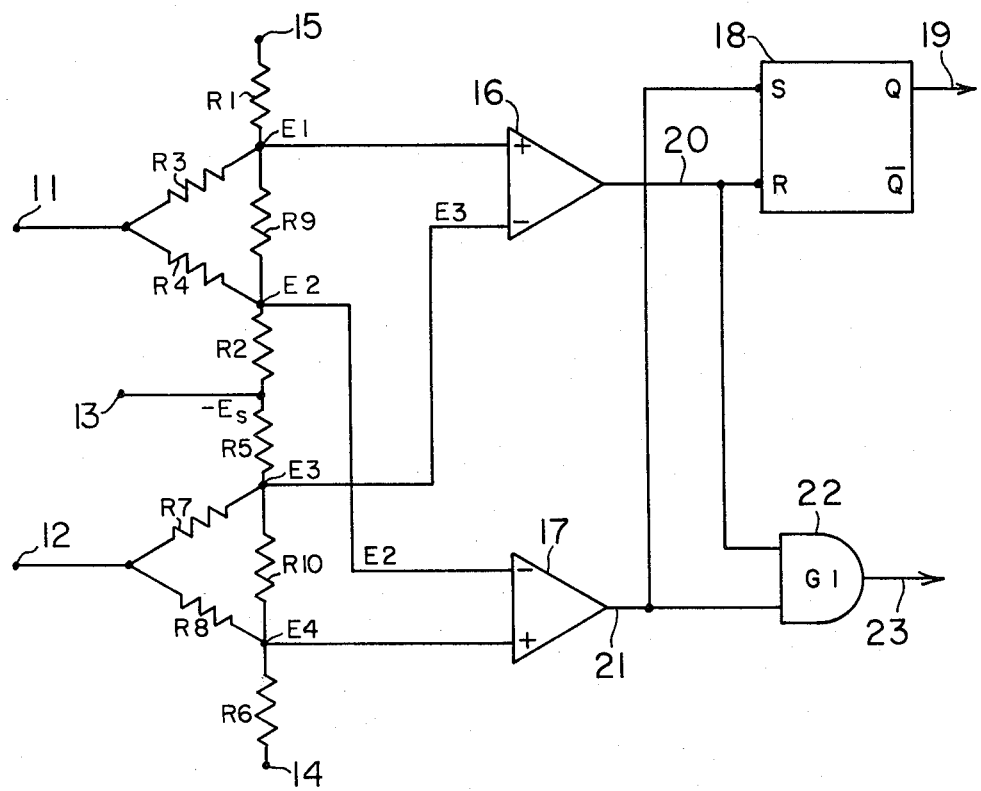
FIG. 1 is a schematic diagram, partly in block form, of a circuit in accordance with the present invention.
Figure 2:
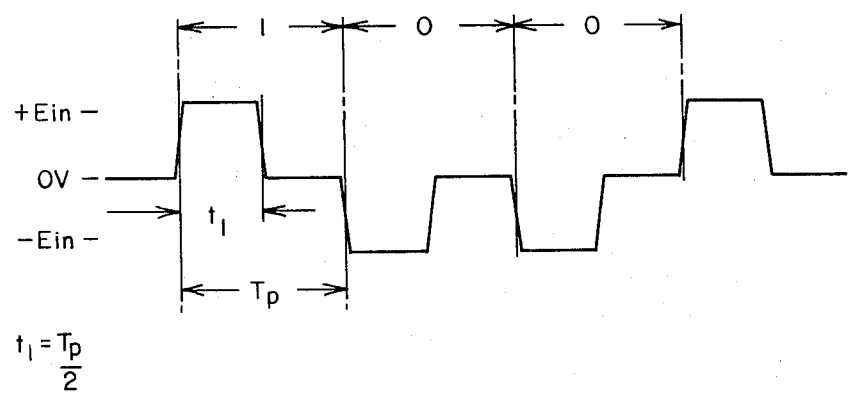
FIG. 2 is a waveform representative of a tri-level signal as utilized to convey data and clock information.

Referring to FIG. 1 there is shown a pair of symmetrical bias networks each comprised of resistive elements. The first bias network is made up of serially connected resistors R1, R9 and R2 in conjunction with serially connected resistors R3 and R4. Serially connected resistors R3 and R4 are connected in parallel with resistor R9 while the junction between resistors R3 and R4 is connected to input terminal 11. Terminal 11 receives the true tri-level input signal as depicted in FIG. 3A. A tri-level signal is an encoded signal containing both clock and data as shown in FIG. 2. A logic "one" is denoted by a positive going pulse for a first half period of $T_p$. During the second half period of $T_p$ the signal is always returned to zero volts.

FIGS. 3A and 3B show a differential RZ tri-level signal for transmission over a two wire cable. One side of resistor R2 is connected to a source of negative biasing potential, $-E_s$, at a terminal 13. The other side of resistor R2 is connected as shown with resistors R4 and R9, point E2 in the network, and is also connected to the negative input terminal of a comparator 17. One side of resistor R1 is connected to a source of positive biasing potential, $+E_s$, at a terminal 15. The other side of resistor R1 is connected as shown with resistors R3 and R9, point E1 in the network, and is also connected to the positive input of a comparator 16. This resistive network, made up of resistors R1, R2, R3, R4, and R9, forms a bias network functioning to offset the input signal applied to terminal 11 so that the comparators 16 and 17 may detect the "one" or the "zero" state of the input. The true input, shown in FIG. 3A, is attenuated and level shifted to a positive voltage equal to one half the new or attenuated amplitude excursion of a "one" or "zero" at point E1 and is attenuated a like amount and is level shifted to a negative voltage equal to one half the new or attenuated amplitude excursion of a "one" or "zero" at point E2. The attenuated and level shifted signals appearing at points E1 and E2 are respectively shown in FIGS. 4A and 4E.

The second bias network is made up of serially connected resistors R5, R10 and R6 in conjunction with serially connected resistors R7 and R8. Serially connected resistors R7 and R8 are connected in parallel with resistor R10 while the junction between resistors R7 and R8 is connected to input terminal 12. Terminal 12 receives the complement tri-level input signal as depicted in FIG. 3B. One side of resistor R5 is connected to the source of negative biasing potential, $-E_s$, at terminal 13. The other side of resistor R5 is connected as shown with resistors R7 and R10, point E3 in the second network, and is also connected to the negative input terminal of comparator 16. One side of resistor R6 is connected to the source of positive biasing potential, $+E_s$, at a terminal 14. Terminals 14 and 15 may be connected together. The other side of resistor R6 is connected as shown with resistors R8 and R10, point E4 in the network, and is also connected to the positive input of comparator 17. This second resistive network, made up of resistors R5, R6, R7, R8 and R10, forms a bias network functioning to offset the input signal applied to terminal 12 so that comparators 16 and 17 may detect the "one" or the "zero" state of the input. The complement input, shown in FIG. 3B, is attenuated and level shifted to a positive voltage equal to one half the new or attenuated amplitude excursion of a "one" or "zero" at point E4 and is attenuated a like amount and is level shifted to a negative voltage equal to one half the new or attenuated amplitude excursion of a "one" or "zero" at point E3. The attenuated and level shifted signals appearing at points E3 and E4 are respectively shown in FIGS. 4B and 4D.

Resistors R1, R2, R3, R4 and R9 of the first network are respectively of the same values as are resistors R6, R5, R8, R7 and R10 of the second network so that the first and second networks are symmetrical to produce equal attenuations and biases for the true and complement inputs. The positive and negative offsets and biases are respectively also equal in magnitude.

Comparators 16 and 17 are known in the art (may for example be of the LM119 type) and are constructed such that their outputs will change state only when the difference of the input voltages (the voltage at the negative input subtracted from the voltage at the positive input) changes polarity (E1–E3 for comparator 16 and E4–E2 for comparator 17). These relationships are shown at FIGS. 4A, B and C and FIGS. 4D, E and F respectively. FIGS. 4C and 4F respectively show the outputs from comparators 16 and 17. Comparator 16 is the "zero" (or first binary character) state detector and comparator 17 is the "one" (or second binary character) state detector. As may be seen from FIGS. 4A, B and C, the conditions for a change of state of comparator 16 are met at times c and d. As may be seen from FIGS. 4D, E and F, the conditions for a change of state of comparator 17 are met at times a and b.

The outputs from comparators 16 and 17 are fed to the clock and data extraction circuitry made up of RS flip-flop 18 and NAND gate 22. Flip-flop 18 is set by a "one" (e.g., a negative going pulse representing a "one") appearing on the output of comparator 17 over line 21 to the set, S, input of the flip-flop. Flip-flop 18 is reset by a "zero" (e.g., also a negative pulse representing a "zero") appearing in the output of comparator 16 over line 20 to the reset, R, input of the flip-flop. Thus, the output from flip-flop 18 over line 19 is the data contained in the input signals in NRZ form. The comparator outputs on lines 20 and 21 are also applied to NAND gate 22 to form clock pulses by combining the "one" and "zero" signals. The above circuitry and method of operation produces a true differential receiver having high common mode rejection of noise. Since each input signal to the comparators experiences the same attenuation, any common mode voltage (a voltage of equal direction and magnitude) will be ignored by the comparators. High common mode rejection is necessary to obtain reliable signal transmission between two units that operate in a high noise environment.

The resistor networks provided make use and selection of proper resistor values simple. The bias voltages are developed across resistors R9 and R10. Resistors R9 and R10 are of equal values and once this value is selected, the voltage developed across the resistor R9 or R10 remains constant for any value of signal input. This property permits a simple selection of components. Signal attenuation is determined by the ratio of R1/R1+R3 or the corresponding resistors in other legs. Resistors R9 and R10 are determined by the desired voltage drop across these resistors once the attenuation resistors R1, R3, etc. are selected.

While a particular embodiment of the invention has been shown and described, modifications may be made within the spirit and scope of the invention; and it is intended in the appended claims to cover such modifications.

What is claimed is:

1. A receiver for receiving RZ tri-level bipolar signals, which signals are transmitted as true and complement signals, from a two-wire transmission line, comprising:
    a first resistive network for shifting the bias level of said true signal in a positive direction at a first output and in a negative direction of equal magnitude at a second output;
    a second resistive network symmetrical with said first resistive network for shifting the bias level of said compelement signal in a positive direction at a third output and in a negative direction of equal magnitude at a fourth output;
    a first comparator having a fifth output and responsive to each change of polarity of the difference of the voltages at said first and third outputs to change the state of said fifth output and thus signal a first binary character; and
    a second comparator having a sixth output and responsive to each change of polarity of the difference of the voltages at said second and fourth outputs to change the state of said sixth output and thus signal a second binary character.

2. A receiver according to claim 1 further characterized by the provision of means having seventh and eighth outputs and responsive to signals appearing on said fifth and sixth outputs for producing signals indicative of data on said seventh output and for producing signals indicative of clock pulses on said eighth output.

3. A receiver according to claim 1 wherein said first and said second resistive networks attenuate said true and complement signals by equal amounts.

4. A receiver according to claim 1 further characterized by the provision of RS flip-flop means for receiving the signals from said fifth and said sixth outputs for producing data signals in NRZ form.

5. A receiver according to claim 4 further characterized by the provision of NAND gate means for receiving the signals from said fifth and said sixth outputs for producing clock pulses in NRZ form.

6. A receiver according to claim 5 wherein said first and said second resistive networks attenuate said true and complement signals by equal amounts, whereby high common mode rejection of noise is provided.

7. A receiver for receiving RZ tri-level bipolar signals, which signals are transmitted as true and complement signals over a two-wire transmission line, and for producing NRZ data and clock signals therefrom, comprising:
    a first resistive network coupled to a first wire of said two-wire transmisson line for shifting said true signal in a positive bias level direction as a first output signal and in a negative bias level direction of equal magnitude as a second output signal;
    a second resistive network, symmetrical with said first resistive network and separate therefrom, coupled to the second wire of said two-wire transmission line for shifting said complement signal in a positive bias level direction as a third output signal and in a negative bias level direction of equal magnitude as a fourth output signal;
    first comparator means for generating a fifth output signal and responsively coupled to said first and third output signals for changing the state of said fifth output signal;
    second comparator means for generating a sixth output signal and responsively coupled to said second and fourth output signals for changing the state of said sixth output signal; and, extraction means for generating seventh and eighth output signals and coupled to said fifth and sixth output signals for producing said seventh output signal as indicative of said NRZ data signal and for producing said eighth output signal as indicative of said NRZ clock signal.

8. A receiver according to claim 7 wherein said extraction means includes:

first bistable means coupled to said fifth and sixth output signals for producing said seventh output signal as indicative of said NRZ data signal; and second bistable means coupled to said fifth and sixth output signals for producing said eighth signal as indicative of said NRZ clock signal.

9. A receiver according to claim 8 wherein said first bistable means is an edge-triggered flip-flop and said second bistable means is a NAND gate.

10. A receiver for receiving RZ tri-level bipolar signals, which signals are transmitted as true and complement signals over a two-wire transmission line, and for producing NRZ data and clock signals therefrom, comprising:

first resistor network means coupled to said true signal for generating a positive bias level directioned first output signal and an equal amplitude, negative bias level directioned second output signal;

second resistor network means, separate from said first resistor network means, coupled to said complement signal for generating a positive bias level directioned third output signal and an equal amplitude, negative bias level directioned fourth output signal;

said first, second, third, and fourth output signals all being of equal amplitudes;

first comparator means coupled to said first and third output signals for generating a fifth output signal;

second comparator means coupled to said second and fourth output signals for generating a sixth output signal;

first bistable means coupled to said fifth and sixth output signals for generating said NRZ data signal; and second bistable means coupled to said fifth and sixth output signals for generating said NRZ clock signal.

11. A receiver of claim 10 wherein said first bistable means is an edge-triggered flip-flop and said second bistable means is a NAND gate.

* * * * *